US011385164B2

(12) United States Patent
Douet et al.

(10) Patent No.: US 11,385,164 B2
(45) Date of Patent: Jul. 12, 2022

(54) METHOD FOR CALIBRATING AN ANALYSIS DEVICE, AND ASSOCIATED DEVICE

(71) Applicants: BIOMERIEUX, Marcy-l'étoile (FR); COMMISSARIAT A L'ENERGIE ATOMIQUE ET AUX ENERGIES ALTERNATIVES, Paris (FR)

(72) Inventors: Alice Douet, Villebois-Lavalette (FR); Quentin Josso, Lyons (FR)

(73) Assignees: BIOMERIEUX, Marcy-l'Étoile (FR); COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 177 days.

(21) Appl. No.: 15/733,089

(22) PCT Filed: Nov. 27, 2018

(86) PCT No.: PCT/FR2018/052990
§ 371 (c)(1),
(2) Date: May 13, 2020

(87) PCT Pub. No.: WO2019/115901
PCT Pub. Date: Jun. 20, 2019

(65) Prior Publication Data
US 2020/0363315 A1 Nov. 19, 2020

(30) Foreign Application Priority Data
Dec. 15, 2017 (FR) ...................................... 1762265

(51) Int. Cl.
*G01N 15/14* (2006.01)
*G03H 1/08* (2006.01)

(52) U.S. Cl.
CPC ....... *G01N 15/1468* (2013.01); *G03H 1/0866* (2013.01); *G01N 2015/1452* (2013.01); *G01N 2015/1454* (2013.01)

(58) Field of Classification Search
CPC .. G03H 1/0866; G03H 1/0005; G03H 1/0443; G03H 2001/0033;
(Continued)

(56) References Cited

U.S. PATENT DOCUMENTS 8,791,985 B2 * 7/2014 Grier ...................... G01N 15/10
356/336
8,830,476 B2 * 9/2014 Berg .................. G01N 15/1434
356/458
(Continued)

FOREIGN PATENT DOCUMENTS

WO  WO-2016/075279 A1  5/2016

OTHER PUBLICATIONS

International Search Report issued in PCT Patent Application No. PCT/FR2018/052990 dated Mar. 1, 2019.
(Continued)

Primary Examiner — Hoa Q Pham
(74) Attorney, Agent, or Firm — Marshall, Gerstein & Borun LLP

(57) ABSTRACT

A method of calibration of a device for analyzing at least one element present in a sample, said device including: a detection assembly configured to acquire an image formed by the interference between a light source and said sample; and digital processing means configured to detect a digital position of at least one element in said sample based on said acquired image; said calibration method including the implementation of a plurality of predetermined displacements of said sample with respect to said detection assembly and, for all of said displacements, the detection of a digital
(Continued)

position of a same element to determine the digital position and the real position matching model according to the predetermined displacements and to the digital positions of said element after each displacement.

9 Claims, 3 Drawing Sheets

(58) Field of Classification Search
CPC ..... G03H 2001/005; G03H 2001/0447; G03H 2001/0883; G03H 2001/2655; G03H 2001/0452; G03H 2222/45; G03H 2227/03; G01N 15/0227; G01N 15/1468; G01N 15/1429; G01N 15/1456; G01N 15/1025; G01N 2015/1452; G01N 2015/1454; G01N 21/453; G01N 21/41

USPC .............. 356/335–343, 512, 458; 348/40, 79
See application file for complete search history.

(56) References Cited

U.S. PATENT DOCUMENTS

| | | | |
|---|---|---|---|
| 9,188,529 B2* | 11/2015 | Shpaisman | G01N 21/453 |
| 10,267,726 B2* | 4/2019 | Delattre | G01N 15/1475 |
| 2010/0253762 A1* | 10/2010 | Cheong | G03H 1/0866 |
| | | | 348/E13.001 |

OTHER PUBLICATIONS

Wilson et al., "3D Localization of weak scatterers in digital holographic microscopy using Rayleigh-Sommerfeld back-propagation," *Optics Express*, vol. 16, No. 7 (2008).

Douet et al., "Fast Raman single bacteria identification: toward a routine in-vitro diagnostic," *Proceedings of Spie*, vol. 9887 (2016).

Choi et al., "Three-dimensional volumetric measurement of red blood cell motion using digital holographic microscopy," *Applied Optics, Optical Society of America*, vol. 48, No. 16 (2009).

Langehanenberg et al., "Automated three-dimensional tracking of living cells by digital holographic microscopy," *Journal of Biomedical Optics*, vol. 14, No. 1 (2009).

Lee et al., "Holographic microscopy of holographically trapped three-dimensional structures," *Optics Express*, vol. 15, Issue 4 (2007).

* cited by examiner

METHOD FOR CALIBRATING AN ANALYSIS DEVICE, AND ASSOCIATED DEVICE

TECHNICAL BACKGROUND

The present disclosure relates to the field of optical analysis of biological particles. The biological particles may be microorganisms such as bacteria, fungi, or yeasts, for example. They may also be cells, multicellular organisms, or any other particle of contaminating particle or dust type.

The invention particularly advantageously applies to position an optical system on a biological particle of interest to improve the measurements of the physiological characteristics of the biological particle, for example, by means of Raman spectroscopy.

BACKGROUND

Raman spectroscopy is a non-destructive method for determining the physiological characteristics of a biological particle. Such a method exploits the physical phenomenon according to which a medium slightly modifies the frequency of the light flowing through the medium. Such a modification of the light frequency corresponds to an energy exchange between the light ray and the medium, and provides information relative to the biological particle present in the medium. Raman spectroscopy comprises sending monochromatic light, for example, a laser beam, on the biologic particle and analyzing the diffused light.

Document WO 2016/075279 describes a method of analysis of a sample containing biological particles by means of an imaging system implementing a Raman spectroscopy. A detection assembly looks for the position of a biological particle in a medium. When a particle is selected, the sample and/or the detection assembly is displaced so that the laser beam is focused on the biological particle.

To know the displacement instruction to be applied to the sample and/or to the detection assembly with respect to the laser beam, a digital position and real position matching model is used to match the measured position of the central pixel of the particle in the image and the real displacements to be performed.

When the displacement is performed, an analysis assembly fires a laser on the particle and captures the light having interacted with the particle to determine at least one characteristic of the particle.

Uncertainties, construction defects or defects due to the tolerances of the different mechanical and optical parts may altogether result in a significant inaccuracy of the displacement to be performed to correctly position the particle with respect to the analysis assembly. Indeed, a fine analysis mode, such as confocal Raman microspectroscopy adapted to a measurement on an individual cell, imposes positioning an object having a size smaller than 1 $\mu m^3$, the confocal volume, with an object having its characteristic dimension also in the order of one $\mu m^3$.

The technical problem targeted by the present invention accordingly is to improve the accuracy of the displacement of the sample and/or of the detection assembly to improve the analysis of a biological particle present in a sample.

SUMMARY OF THE DISCLOSURE

To solve the technical problem, the invention provides calibrating the model for matching digital positions and real position by observing the influence of a plurality of displacement instructions on the position of at least one element in the image originating from the detection assembly. For this purpose, the invention uses a very fast detection assembly integrating a simple acquisition with no accurate focusing, associated with a digital reconstruction of the focusing comprising at least one digital focusing intended to detect an element present in the sample and to rapidly obtain a position of said element.

For this purpose, the invention concerns a method of calibration of a device for analyzing at least one element present in a sample, said device comprising:

a detection assembly comprising a light source configured to illuminate said sample, an optical system configured to collect the light radiation originating from said sample, and a planar image sensor configured to acquire a holographic image formed by the interference between a reference wave originating from said light source and a wave diffracted by said radiation originating from the sample; and digital processing means configured to detect a digital position of at least one element in said sample based on said acquired holographic image and to calculate a real position of said element according to said digital position and to a digital position and real position matching model.

The invention is characterized in that said calibration method comprises implementing a plurality of predetermined displacements of said sample with respect to said optical system and, for each of said displacements, detecting a digital position of a same element to determine said digital position and real position matching model according to the predetermined displacements and to the digital positions of said elements after each displacement, said detection comprising the steps of:

acquiring an image;

digitally constructing a series of electromagnetic matrices modeling, by digital propagation of said acquired holographic image, the electromagnetic wave in planes parallel to the plane of the image sensor and comprised in said sample for a plurality of deviations with respect to said plane;

based on the series of electromagnetic matrices, determining an average focusing matrix for said sample and determining the corresponding electromagnetic matrix Ifmoy;

identifying said same element in the first corresponding electromagnetic matrix Ifmoy, and determining said digital position of said same element in said electromagnetic matrix Ifmoy.

The invention thus enables to generally compensate the optical defects of the detection assembly and the mechanical defects resulting from the displacement between the sample and/or the detection assembly.

The optical system of the detection assembly may advantageously be reused to perform a Raman microspectroscopic analysis since the mispositioning between the optical axis of the optical system and the normal axis of the sample is compensated by the use of the calibrated matching model according to the invention.

To be able to rapidly determine the matching model, the focusing is digitally performed from an out-of-focus image associated with a digital reconstruction of the focusing. Thus, the digital position of the element is determined from the digitally focused image. As a result, the measurement instruments are simplified since it is not necessary to use highly-accurate focusing devices to focus an image in the order of some hundred nanometers.

The matching model of the invention thus enables to rapidly detect with a great accuracy the real position of a particle based on a digital position of a particle of an image. The matching model may then be used to calculate the displacement of the sample with respect to the analysis system, and thus to accurately focus a laser shot on a particle having a known position in the image. The positioning difference between the use of a transformation scale and the matrix of the invention is small but it is sufficient to greatly improve the performance of a Raman spectroscopy, for example.

For a typical example, a laser beam is focused on the (0, 0, 0) coordinates of a three-dimensional digital space. A particle of interest is detected at pixel coordinates (550, 0, 0). By using a transformation scale linked to the theoretical characteristics of the various elements forming the system, the displacements of the sample may correspond to coordinates (39.71, 0, 0) in micrometers. With the invention and the calibration of the matching model, the displacements of the sample correspond to coordinates (39.61, −0.23, 0.18) in micrometers.

The invention thus enables to obtain the high positioning accuracy required by this type of application, while doing away with too strong or too expensive constraints relative to the design of the instrument.

According to the invention, said position and real position matching model corresponds to a triaxial matrix along three axes of a metric system, said step of determining said digital position of said same element in said electromagnetic matrix Ifmoy being carried out along an axis, modeling the position of said element in the depth of said sample, according to said electromagnetic matrix Ifmoy at the average focusing distance of said sample.

Such an embodiment thus enables to determine the depth of the element in the sample by using the digital reconstructions of the focusing. Indeed, the focusing maximum on an element of the sample corresponds to an accurate position in the depth of the sample that can be digitally estimated.

According to an embodiment, the predetermined displacements are performed in two opposite directions for each axis of said metric system.

This embodiment aims at performing two displacements of opposite directions per displacement axis to take into account the dissymmetrical behavior of the displacement, for example implement by the operation of a stage with stepper motors. Preferably, this embodiment is also implemented with stages which comprise correction members of backlash correction type, having the function of correcting this type of error. For example, along a first axis and starting from the central position, the displacement means perform a first 15-micrometer displacement and a second-15-micrometer displacement. This also results in a total 30-micrometer displacement and also in greater variations of the position of the element. Thus, the determination of the ratio between the digital and real displacements is more accurate.

According to an embodiment, the determination of said digital position and real position matching model is performed via an average of the variations of the digital positions of a plurality of elements present in said holographic image. This embodiment also enables to improve the accuracy of the ratio between the digital and real displacements.

According to an embodiment, said optical system having an optical axis and performing the conjugation between a focusing plane and a focal plane, the step of acquisition of said holographic image is carried out while said optical system is placed with respect to said sample in such a way that said elements of said sample are not in said focusing plane.

According to an embodiment, before the steps of acquisition of a holographic image to obtain said digital positions of said element, the method comprises a step of acquisition of a background image, the holographic images obtained during said acquisition steps being normalized by said background image.

This embodiment enables to suppress the impurities present on the optical system or the sensor to improve the sharpness of the acquired image for the different predetermined displacements of said sample relative to said optical system.

According to an embodiment, said element corresponds to a landmark of said sample. For example, a marker may be positioned on or inside of the sample with characteristics clearly distinct from the medium to ease the detection of the digital position of the marker in the first electromagnetic matrix.

According to an embodiment, said element corresponds to a particle present in said sample. Such an embodiment enables to reuse the particles present in the sample to perform the calibration. Thus, it is not necessary to position a marker in the sample.

According to an embodiment, said step comprising determining said digital position of said particle in said electromagnetic matrix Ifmoy is performed by looking for the center of said particle.

Certain particles extend over a plurality of pixels of the image and over a plurality of depth units of the sample, the present embodiment aims at looking for a center of each particle to determine the position of the particle. Thereby, this embodiment improves the accuracy of the Raman microspectroscopy since this method is all the more accurate as the focusing is performed on the center of a particle.

According to an embodiment said digital position and real position matching model between is formed by considering a plurality of particles present in said sample, the digital positions of the particles between two consecutive images being determined by looking for the positions of the particles of said two images, by calculating the vectors coupling the particles two by two and by determining a probable displacement vector corresponding to the most recurrent vector.

Although the use of the particles of the sample enables to suppress the step of attaching a marker, recognizing the displacement of a specific particle between two images containing a plurality of particles may be difficult. To overcome this problem, this embodiment provides calculating the displacement vectors of a plurality of particles to determine the general displacement of the particles by means of the most recurrent vector.

To determine the most recurrent vector, each vector may be previously approximated to mask the inaccuracies in the detection of the set of vectors. Similarly, to simplify the correlation of the vectors, only a portion of the two images may be considered.

BRIEF DESCRIPTION OF THE DRAWINGS

The way to implement the present invention, as well as the resulting advantages, will better appear from the description of the following non-limiting embodiment, given as an indication, based on the accompanying drawings, where

FIG. 1: a simplified cross-section view of a device for analyzing a particle present in a sample according to an embodiment of the invention;

FIG. 2: a simplified representation of a flowchart of the operation of the processing means of FIG. 1 according to a first embodiment;

FIG. 3: a simplified representation of a flowchart of the operation of the average focused image determination unit of FIG. 2; and FIG. 4: a representation of the images obtained for five displacements of the sample of the analysis device of FIG. 1.

DETAILED DESCRIPTION

Figure 1:
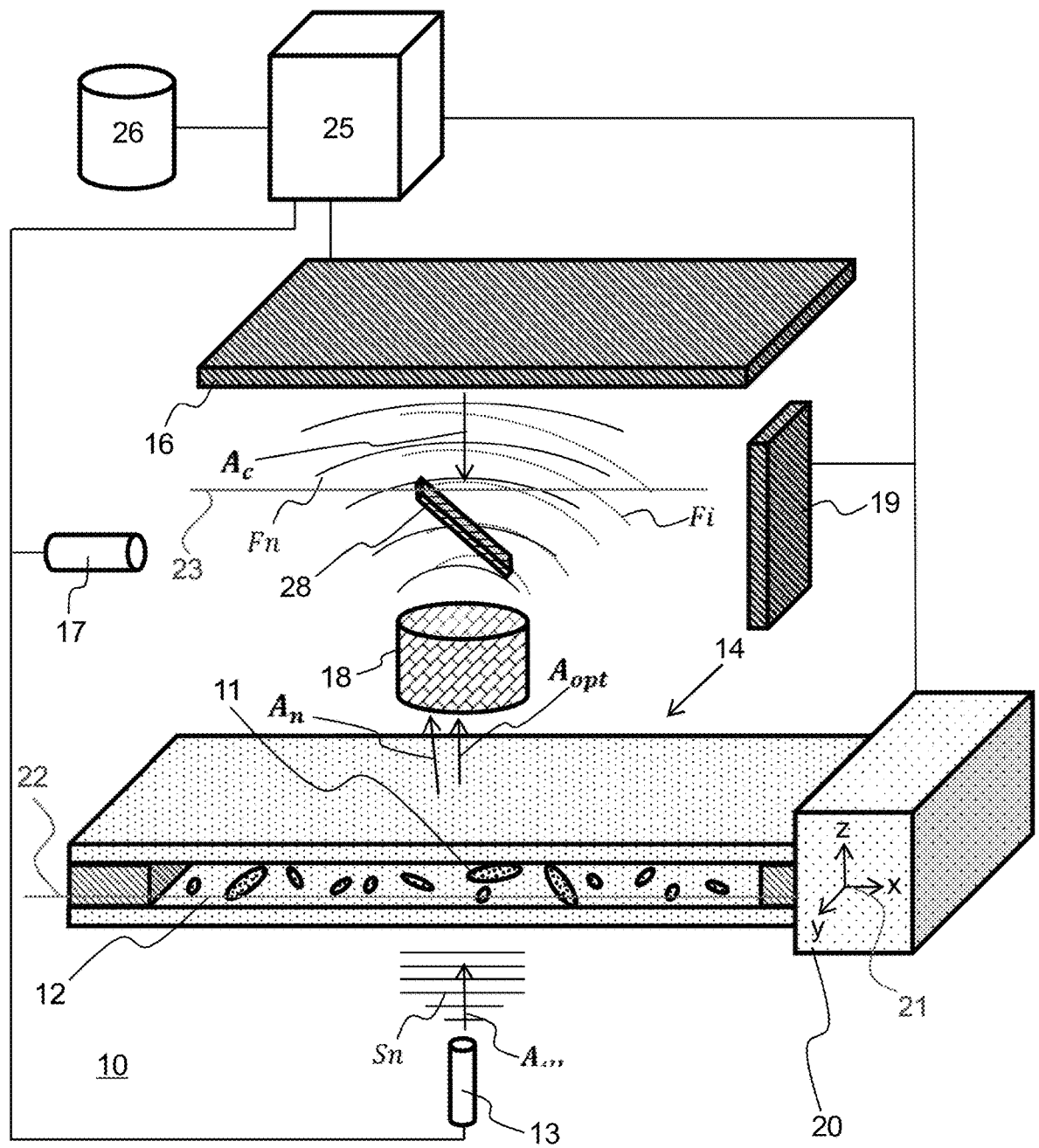
FIGS. 1 to 4 show.

FIG. 1 illustrates a device 10 for analyzing a particle 11 present in a sample 12. Sample 12 is arranged between a light source 13 which is spatially and temporally coherent (for example, a laser) or pseudo-coherent (for example, a light-emitting diode, a laser diode), having an illumination axis $A_{ill}$, and a digital sensor 16 sensitive in the spectral range of light source 13. Preferably, light source 13 has a small spectral width, preferably smaller than 200 nm, smaller than 100 nm, or even smaller than 25 nm. Such spectral properties provide light source 13 with a time coherence allowing a holographic reconstruction in a range compatible with the encountered positioning uncertainties in the order of some hundred nanometers. The geometry of light source 13, its apparent size, and its position in space are preferably selected according to the optical properties of the system (enlargement, size of the source point . . . ) so that the spatial coherence of light source 13 is not limiting with respect to the time coherence defined by the spectral width properties provided hereabove.

In the following, reference is made to the central emission wavelength of light source 13, for example, in the visible range. Light source 13 emits a coherent signal Sn oriented on a first surface of the sample, for example, conveyed by a waveguide such as an optical fiber.

Sample 12 is a liquid such as water, a buffer solution, a culture medium or a reactive medium (comprising or not an antibiotic), containing the particles 11 to be observed.

As a variation, sample 12 may appear in the form of a solid medium, preferably translucent, such as an agar-agar gelose, having particles 11 located inside and on top of it. Sample 12 may also be a gaseous medium. Particles 11 may be located within the medium or at the surface of sample 12.

Particles 11 may be microorganisms such as bacteria, fungi, or yeasts. They may also be cells, multicellular organisms, or any other particle of contaminating particle or dust type. The size of the observed particles 11 varies from 500 nanometers to several hundreds of micrometers, or even a few millimeters.

Sample 12 is contained in an analysis chamber, vertically delimited by a lower plate and an upper plate, preferably parallel planar plates, for example, conventional microscope plates. The analysis chamber is laterally delimited by an adhesive or by any other tight material. As a variation, the sample may be deposited on a microscope plate or an equivalent support, without being imprisoned in an analysis chamber.

The lower and upper plates are transparent to the wavelength of light source 13, the sample and the chamber for example giving way to more than 50% of the wavelength of light source 13 under a normal incidence on the lower plate.

Preferably, particles 11 are arranged in sample 12 at the level of the upper plate. The lower surface of the upper plate comprises for this purpose ligands enabling to bind the particles, for example, polycations (e.g. poly-L-lysine) or antibodies in the case of microorganisms. This enables to contain particles 11 within a thickness equal to or close to the depth of field of the optical system, that is, within a thickness smaller than 1 mm (e.g. lens), and preferably smaller than 100 micrometers (e.g. microscope lens) Particles 11 may however displace in sample 12.

Preferably, the device comprises an optical system 18 for example formed of a microscope lens, for example, a fixed-focus lens, and of a tube lens, arranged in the air. Optical system 18 is optionally equipped with a filter capable of being located in front of the lens or between the lens and the tube lens. Optical system 18 is characterized by its optical axis $A_{opt}$, its object plane, also called plane of focus, at a distance from the lens, and its image plane, which is the conjugate of the object plane relative to the optical system.

In other words, an object located in the object plane has a corresponding sharp image of this object in the image plane, also called focal plane 23. The optical properties of optical system 18 are fixed (e.g. fixed focus optical system). The object and image planes are ideally orthogonal to the optical axis and assumed to be such for the mathematical models described hereafter.

Image sensor 16 is planar and is located, opposite an upper surface 14 of sample 12, in the focal plane 23 or close thereto, to within assembly and construction errors. Image sensor 16, for example, a planar CCD or CMOS sensor, comprises a periodic two-dimensional grating of elementary sensitive sites, and a proximity electronic system which sets the exposure time and the resetting of the sites, in a way known per se. The output signal of an elementary site is a function of the quantity of radiation of the spectral range incident on said site during the exposure time. This signal is then converted, for example, by the proximity electronic system, into an image point or "pixel" of a digital image.

Image sensor 16 thus generates a digital image in the form of a matrix of C columns and L rows. Each pixel of this matrix, of coordinates (c, l) in the matrix, corresponds in a way known per se to a position of Cartesian coordinates (x(c,l), y(c, l)) in the focal plane 23 of optical system 18, for example, the position of the center of the elementary sensitive site of rectangular shape. Image sensor 16 also comprises an axis $A_c$ normal to the planar surface of image sensor 16 for which the image Ih originating from image sensor 16 has a minimum deformation with respect to the observed scene.

Preferably, the pitch and the filling factor of the periodic grating are selected to respect the Shannon-Nyquist criterion regarding the size of the observed particles, to define at least two pixels per particle. Thus, image sensor 16 acquires a transmission image of sample 12 in the spectral range of light source 13.

The image Ih acquired by image sensor 16 comprises holographic information since it results from the interference between a wave Fi diffracted by particles 11 and a reference wave Fn having crossed sample 12 without having interacted therewith.

As described hereabove, in the case of a CMOS or CCD sensor, the digital image Ih acquired and stored in digital processing means 25 is an intensity image, the phase information being thus here intensity-coded, with digital image Ih according to relation:

$$Ih = \begin{pmatrix} ih(1,1) & \ldots & ih(c,1) & \ldots & ih(C,1) \\ \vdots & \ddots & \vdots & \ddots & \vdots \\ ih(1,l) & \ldots & ih(c,l) & \ldots & ih(C,l) \\ \vdots & \ddots & \vdots & \ddots & \vdots \\ ih(1,L) & \ldots & ih(c,L) & \ldots & ih(C,L) \end{pmatrix}$$

As a variation, it is possible to divide the coherent signal Sn originating from light source 13 into two components, for example, by means of a beam splitter. The first component is then used as a reference wave and the second component is diffracted by sample 12, the image in the image plane of optical system 18 resulting from the interference between the diffracted wave Fi and the reference wave Fn.

The intensity image Ih acquired by image sensor 16 is not focused on a particle 11 to be observed and the obtaining of information focused on a particle 11 is digitally achieved by digital processing means 25 connected to image sensor 16 to receive the images Ih acquired by the latter.

"Out of focus" here means that there is no intersection between the plane of focus and the particle 11 which is to be observed. Digital processing means 25 may correspond to a computer, a microcontroller, a touch tablet or a smartphone, or generally any computer system based on a processor capable of receiving data, of processing the data by implementing computer instructions stored in a computer memory, and of delivering and/or storing in a computer memory the result of the processing.

Digital processing means 25 may be connected in wired or wireless fashion to image sensor 16 or by means of a wireless communication. Digital processing means 25 may be associated with a screen to display intermediate or final results of the method of the invention. As a variation, digital processing means 25 may correspond to an assembly of a plurality of computer systems with a system dedicated to image sensor 16 and other specific systems for the other elements coupled to digital processing means 25.

Light source 13, image sensor 16, and digital processing means 25 form a device for analyzing at least one particle 11 in sample 12 to obtain the position of at least one particle of interest 11 in sample 12.

To perform the analysis of a specific particle of interest 11, present in sample 12, the device also integrates a stage 20 for displacing sample 12. Stage 20 provides a triaxial displacement of axes X, Y, Z based on stepper motors controlled by a control unit, for example, digital processing means 25, according to a position or displacement instruction. Stage 20 enables to displace sample 12 with respect to optical system 18 along an axis Z ideally parallel to optical axis $A_{opt}$ and to displace sample 12 along two other axes X, Y ideally defining a plane orthogonal to optical axis $A_{opt}$. As a variation, stage 20 may be configured to displace optical system 18 and/or light source 13 while sample 12 is fixed.

Thus, displacements along axes X, Y enable to set to the position of optical axis $A_{opt}$ on sample 12, and thus the position of a Raman laser on sample 12. Further, displacements along axis Z enable to set the distance between sample 12 and optical system 18, and accordingly the position of the focal plane 23 (or, equivalently, the position of the confocal volume) with respect to sample 12

Ideally, optical axis $A_{opt}$, the mechanical axis Z of displacement of stage 20, illumination axis $A_{ill}$, the axis $A_c$, normal to the planar surface of sensor 16, and the axis $A_n$, normal to the planar surface of sample 12 should be aligned, but construction errors and the presence of a clearance may make such alignments imperfect when a great accuracy is required. A real axis system, different from system X, Y, Z, linked to the image sensor such as $X_n$, $Y_n$ and $Z_n$ where $X_n$ and $Y_n$ are in the planar surface of sensor 16 and $Z_n$ is collinear to axis $A_c$, can be defined.

The calculations for digitally reconstructing the wavefront described hereafter or displacement instructions are based on such an assumption. In reality, there exist misalignments which are corrected by the invention by means of the calibration of the matching model.

The Raman spectroscopy analysis assembly for example comprises a monochromatic light source 17 and a spectrometer 19. Light source 17 preferably corresponds to a laser.

The beam originating from the laser is directed into optical system 18, and thus onto sample 12, for example, by an assembly of mirrors and filters 28. Optical system 18 enables to focus light source 17 on a specific position of the sample, the focusing position being settable by displacing sample 12 with respect to optical system 18 by means of stage 20. As known per se, stage 20 receives a positioning instruction for sample 12, which enables to position the laser shot thereon, which instruction is for example communicated to digital processing means 25, particularly the position of a particle detected as described hereabove. In particular, digital processing means 25 determine a digital position of the particle according to an image processing and converts the digital position into a real position of the particle in the sample (for example, in a fixed reference frame linked to the device frame or to the stage in a way known per se), the real position being communicated to the displacement means as a position instruction. For this purpose, digital processing means 25 use a model for matching a digital position, noted Pn, and a real position, noted Pr. The calibration of the matching model will be described hereafter.

The Raman diffusion of the laser beam in sample 12 is captured by spectrometer 19 by also passing through the assembly of mirrors and filters 28. The laser and spectrometer 19 are connected to digital processing means 25, which control the laser shot and receive the image of the diffusion. Of course, the different elements may be arranged differently without modifying the invention.

Figure 2:
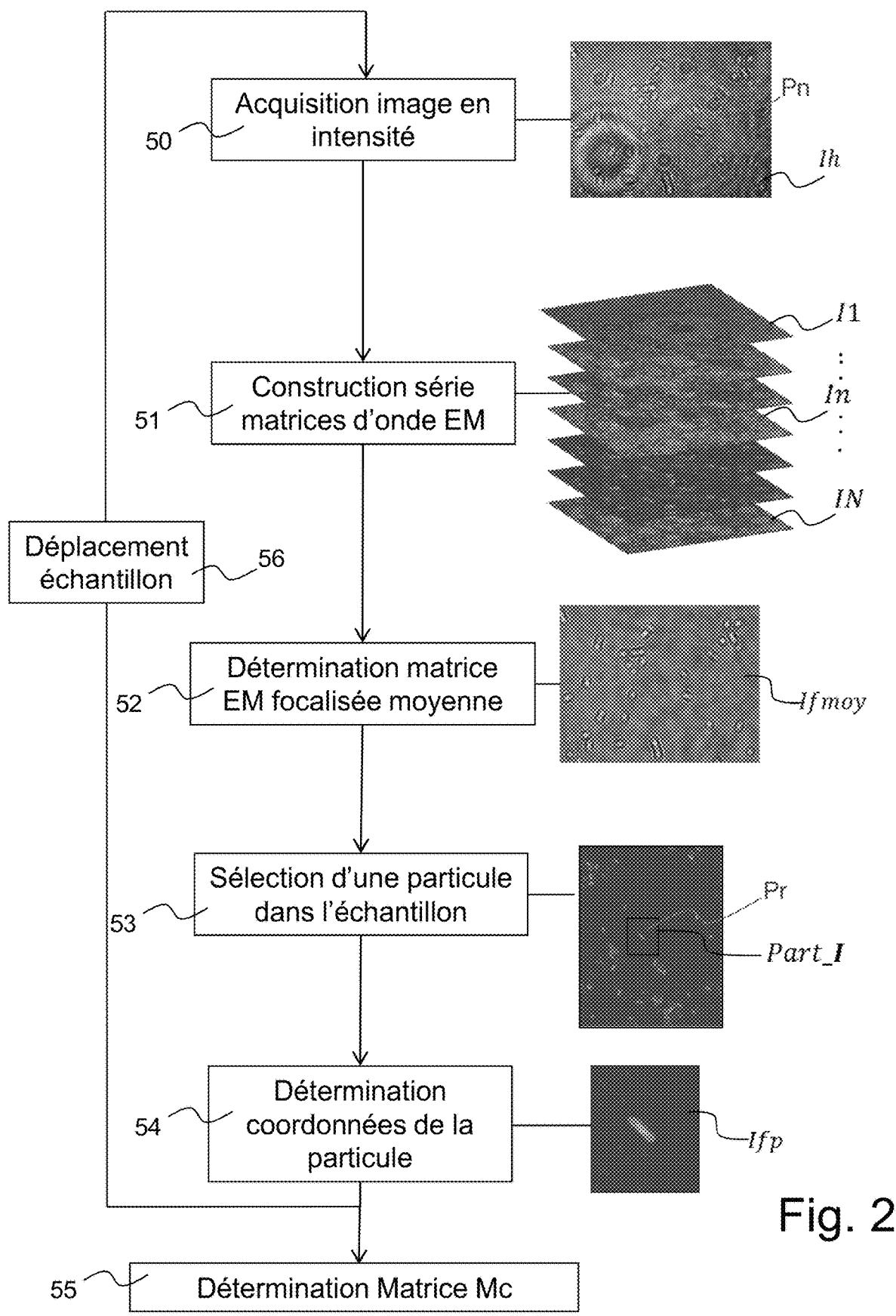

The position of optical system 18 and the displacements of sample 12 aim at focusing the laser beam on a particle of interest 11 present in sample 12. For this purpose, FIG. 2 illustrates the computer processing units 51-56, integrated in digital processing means 25 in the form of computer instructions implemented by the computer, after the acquisition 50 of the intensity image Ih by image sensor 16. A first unit 51 constructs a series of complex matrices I1, ... In, ..., IN, called electromagnetic matrices EM, modeling based on image Ih the light wavefront propagated along the optical axis for a plurality of deviations with respect to the focusing plane 22 of optical system 18, and in particular deviations positioned in the sample.

A method of calculating wavefronts by digital propagation is explained in Sang-Hyuk Lee et al.'s article entitled "*Holographic microscopy of holographically trapped three-dimensional structures*" published in Optics Express, Vol. 15; Nr. 4, Feb. 19, 2017, pp. 1505-1512.

More particularly, noting $h_z(r)$ the Rayleigh-Sommerfeld propagation function, that is:

$$h_z(r) = -\frac{1}{2\pi} \frac{\partial}{\partial z} \frac{e^{ikR}}{R}$$

where:

z is the so-called "defocusing" height, in other words the deviation with respect to the focusing plane 22, r=(|r|, ∂) is the position in polar coordinates in the image plane, of radial coordinate |r| and of angular coordinate, $R^2=|r|^2+z^2$, and k=2πn/λ is a wave number relative to the propagation medium of refraction index n at the wavelength λ of the light source.

Based on this relation, electromagnetic wave a(r, z), of amplitude |a(r,z)| and of phase φ(r,z), in ordinate plane z, can be expressed as:

$$a(r, z) = |a(r, z)|\exp(i\varphi(r, z))$$

$$a(r, z) = \frac{1}{4\pi^2} \int_{-\infty}^{+\infty} B(q) H_{-z}(q) \exp(iqr) d^2q$$

where b(r) is the measured intensity, i.e. image Ih (the intensity of the reference wave is here assumed to be constant), B(q) is th0e Fourier transform of b(r), $H_{-z}(q)$ is the Fourier transform of $h_{-z}(r)$, and q is the dual variable of r in the Fourier transform.

The above equations define an analytic formulation of amplitude a(r, z). Although this model is developed for a propagation in a homogeneous medium (and thus with no modification of the wave number, without the presence of an interface creating a reflection and/or a deviation of the wave, etc.), and accordingly with no relation with sample 12 and the enclosure (which comprise many interfaces and changes of index, for example), the inventors have noted that it enables to reconstruct rich electromagnetic information in relation with the observed particles, as will be described hereafter.

Thus, advantageously, digital processing means 25 store a single wave number, common for all the involved mediums, for example, the index of air.

As a variation, digital processing means 25 store the refraction indexes and thicknesses of the different involved mediums along the optical axis and constructs matrices I1-IN from close to close to take into account the phenomena at the interfaces.

For bacteria, the sampling pitch in the z direction is preferably smaller than one tenth of the thickness of the bacterium, for example, smaller than 0.1 micrometer, and preferably smaller than 0.03 micrometer.

It can thus be understood that a stack of electromagnetic matrices I1-IN can be constructed for ordinates $z_1, z_2, \ldots, z_n, z_N$ along the optical axis, the origin of ordinates (z=0) being taken at the axial focusing position, each matrix In being defined by a complex amplitude $a(r, z_n)$ according to relations:

$$\begin{pmatrix} a(1, 1)_{z_n} & \ldots & a(c, 1)_{z_n} & \ldots & a(C, 1)_{z_n} \\ \vdots & \ddots & \vdots & \ddots & \vdots \\ a(1, l)_{z_n} & \ldots & a(c, l)_{z_n} & \ldots & a(C, l)_{z_n} \\ \vdots & \ddots & \vdots & \ddots & \vdots \\ a(L, 1)_{z_n} & \ldots & a(c, L)_{z_N} & \ldots & a(C, L)_{z_n} \end{pmatrix}$$

$$\forall (c, l) \in [1, C] \times [1, L]: a(c, l)_{z_n} = a(r((c, l), y(c, l)), z_n))$$

Digital processing means 25 then calculate on each matrix In a positive surjective application AS from the complex space $\mathbb{C}^{C \times L}$ to the real space $\mathbb{R}^{C \times L}$:

$$AS(In) = \begin{pmatrix} AS(a(1, 1)_{z_n}) & \ldots & AS(a(c, 1)_{z_n}) & \ldots & AS(a(C, 1)_{z_n}) \\ \vdots & \ddots & \vdots & \ddots & \vdots \\ AS(a(1, l)_{z_n}) & \ldots & AS(a(c, l)_{z_n}) & \ldots & ASD(a(C, l)_{z_n}) \\ \vdots & \ddots & \vdots & \ddots & \vdots \\ AS(a(L, 1)_{z_n}) & \ldots & AS(a(c, L)_{z_n}) & \ldots & AS(a(C, L)_{z_n}) \end{pmatrix}$$

For example, digital processing means 25 calculate the hermitian norm (or its square) of components $a(c,l)_{z_n}$, the absolute value or the square of the imaginary part (noted $Im(a(c,l)_{z_n})$ or of the real part (noted $Re(a(c,l)_{z_n})$ of components $a(c,l)_{z_n}$, or $Re^2(a(c,l)z_n)+Im(a(c,l)_{z_n}))$ or $(Re^2(a(c,l)_{z_n})+Im^2(a(c,l)_{z_n}))^{1/2}$.

Without being bound by theory, matrices AS(I1)-AS(IN) do not necessarily represent a light intensity, but the inventors have noted their resemblance with intensity images obtained under a non-coherent illumination. Particularly, the particles are represented, as in a photograph, in their particle form.

It is thus possible to apply any type of conventional image processing (segmentation, thresholding, detection of particles based on their morphology, etc.), and even for an operator to visually identify the particles (conversely to an image coding interferences which are intensity-coded in the form of fringes). In the following, to simplify the notations, matrices AS(I1)-AS(IN) are noted I1-IN, and notation a(c, $l)_{z_n}$ correspond to $AS(a(c,l)_{z_n})$.

The method then comprises identifying particles in the sample according to matrices I1-IN, and for each identified particle, determining an optimal focusing distance z for this particle, and then determining, in the matrix of series I1-IN corresponding to this distance, a set of pixels belonging to this particle.

Second unit 52 aims at determining an average focusing distance zfmoy from the series of matrices I1-IN and at selecting in this series the matrix, noted Ifmoy, having its distance z equal or the closest to distance zfmoy. As a variation, digital processing means 25 recalculate matrix Ifmoy for distance zfmoy.

Average focusing distance zfmoy is that which best corresponds to the ideal conditions of focusing on the set of particles 11 in the sense of a predetermined focusing criterion. Such a distance can be determined by all known techniques of signal processing or in the field of photography, for example, aufocus. The resulting electromagnetic matrix Ifmoy is sufficiently "focused" to be able to detect particles at different depths in matrix Ifmoy. The detected particles are particularly those comprised in a sample depth equal to the depth of field. As previously described, in a preferred embodiment, the particles are arranged in a volume having a thickness close or equal to this depth of field, so that all or almost all the particles of the sample can be detected in matrix Ifmoy.

Figure 3:
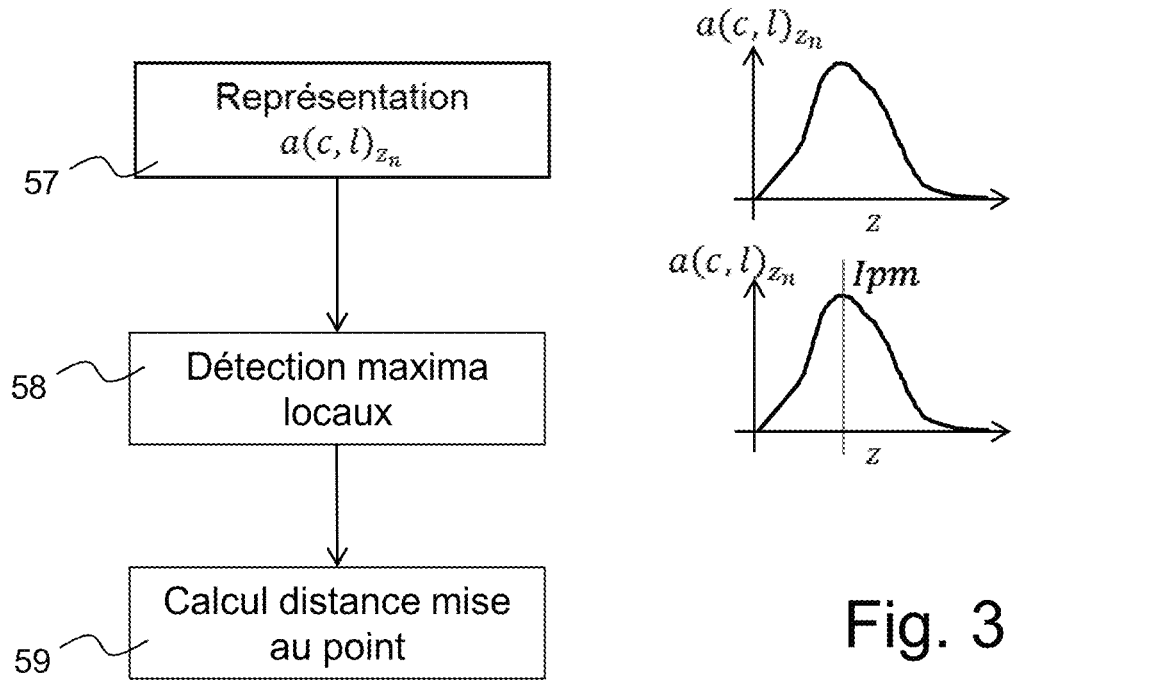

FIG. 3 illustrates an example of determination of the average focusing distance zfmoy by representing, for each coordinate (c, l), the variation of $a(c, l)_{z_n}$ according to the distance z in the image stack I1/N. When a particle is located in sample 12 on the axis, parallel to the optical axis of system 18, of coordinate (c, l) in the focal plane 23, a variation of $a(c, l)_{z_n}$ can be observed. For example, the representation, at 57, of variations $a(c, l)_{z_n}$ is similar to a Gaussian function according to distance z. On the contrary, when no particle is present on this axis, meaning that only the middle of the sample is present, $a(c, l)_{z_n}$ does not or only very slightly varies. It is thus possible to detect, at 58, an optimum Ipm for each coordinate (c, l) representing the specific focusing distance z for this coordinate.

Average focusing distance zfmoy can thus be looked for by digital processing means 25 by calculating, at 59, the average of the distances z obtained by detecting the optimum Ipm of each coordinate (c,l). Ifmoy thus is the matrix of the series of matrices I1-IN closest to the calculated distance z. As a variation, digital processing means 25 select the P coordinates, for example, the 10,000 coordinates, having the greatest variations of their values $a(c,l)_{z_n}$ according to z (for example, having the greatest intervals between the maximum value and the minimum value), and then calculates the distance zfmoy over these P coordinates, which increases the accuracy on this distance.

As a variation, the values $a(c,l)_{z_n}$ of set P are averaged, and the optimum of the curve of averaged values according to z is calculated, the distance z of the optimum being distance zfmoy.

Although the average focusing distance zfmoy illustrates a general focusing of the image, the focusing of each particle 11 is not optimal, particularly due to the depth variations of particles 11 relative to one another. To improve the focusing on a specific particle 11, the invention provides determining an optimum focusing distance for each particle and determining a focused matrix specific to the particle. For this purpose, digital processing means 25 comprise a particle selection unit 53 and a unit 54 for determining the coordinates of particles 11 in the image.

Unit 53 of selection of the particles in matrix Ifmoy may take a plurality of image segmentation shapes of the state of the art, such as a scanning of this matrix to detect the contours of a finite element. As a variation, digital processing means 25 apply a prior thresholding to matrix Ifmoy, the threshold value being for example equal to Moy(Ifmoy)+p×E(Ifmoy), where Moy(Ifmoy) is the average of the pixels of matrix Ifmoy, E(Ifmoy) is their standard deviation, and p is an integer greater than 1, for example, equal to 6.

The values greater than this threshold are then determined as belonging to particles, and an image segmentation on the thresholded matrix is implemented. At the end of the identification, I sets of pixel coordinates (c,l), noted Part_1, ..., Part_i, ... Part_I are thus obtained.

Each set, stored in a memory 26 associated with digital processing means 25, records the coordinates in plane $X_n$, $Y_n$ of the pixels of image Ifmoy belonging to a same particle.

The method then determines, at 54, for each set of coordinates Part_i, which distance z provides the best focusing for the corresponding particle, and then determines what matrix in series I1-IN corresponds to this distance (or calculates a new image for this distance), and finally determines the coordinates of the particle 11 present in image Ifp.

The calculation of the optimum focusing distance is for example performed similarly to the calculation of the average focusing distance. For each coordinate (c,l) of set Part_i, the distance corresponding to the optimum of $a(c,l)_{z_n}$ is calculated, after which the optimal focusing distance z is selected to be equal to the average of the calculated distances z. As a variation, the values $a(c,l)_{z_n}$ of set Part_i are averaged, and the optimum of the curve of averaged values according to z is calculated, the distance z of the optimum being the selected optimal focusing distance.

The optical focusing distance corresponds to an average focusing on particle 11, usually resulting in a focusing on a median plane of particle 11. Such an average focusing enables to obtain information relative to the depth, that is, along axis $Z_n$, of particle 11 in sample 12. It is thus possible to accurately detect, with no focus, the position along $X_n$, $Y_n$ and $Z_n$ of a particle 11 in sample 12.

Particles 11 may extend over a plurality of pixels of the image in plane $X_n$, $Y_n$ and over a plurality of depth units along axis $Z_n$. In this case, the $X_n$, $Y_n$, and $Z_n$ position of particle 11 in sample 12 will be determined according to the center of particle 11.

To focus a laser shot on a particle 11 according to Raman spectroscopy, it is conventional to detect a particle 11 in an image and to displace sample 12 along axis X, X, Y by applying a scale transformation between the position of particle 11 and a real displacement.

The invention provides performing the displacement by means of a triaxial matrix Mc, which is more accurate. Triaxial matrix Mc is obtained, at step 55, by determining the coordinates of at least one particle 11 in a plurality of images Ifp according to a plurality of predetermined displacements 56. Triaxial matrix Mc aims at modeling the real displacement performed by sample 12 as a result of a displacement instruction transmitted by digital processing means 25 to displacement means 20 while integrating the opto-mechanical defects of device 10.

As previously described, the different electromagnetic calculations and displacements are performed under the assumption of an ideal alignment of the different reference frames and axes, which induces a difference between the real displacements and the displacements desired for sample 12 with respect to the detection assembly. A correction is implemented to compensate for this error through a base change matrix Mc enabling to transform the digital position of the particle determined by digital processing means 25 into a real position thereof in the sample.

Triaxial matrix Mc reflects the transformation between the digital space having its values xn, yn, and zn coded in pixels on image Ifp and the real metric system 21 of the sample displacements relative to the optical block, having its values xs, ys, and zs conventionally expressed in micrometers. Thus, triaxial base change matrix Mc can be expressed according to the following relation:

$$\begin{pmatrix} xn \\ yn \\ zn \end{pmatrix} = Mc \times \begin{pmatrix} xs \\ ys \\ zs \end{pmatrix}$$

$$Mc = \begin{pmatrix} Cxx & Cxy & Cxz \\ Cyx & Cyy & Cyz \\ Czx & Czy & Czz \end{pmatrix}$$

To determine the coefficients of triaxial matrix Mc, a plurality of displacements are performed and the variation of the position of the same particle 11 is compared with the displacements instructions transmitted to displacement means 20.

The number of displacements to be performed may depend on the system to be qualified and on its properties. At least one displacement per displacement axis, be it a rotation or a translation, is to be performed. It is also possible for the properties of the system to impose performing a displacement in each displacement direction if the system has behavior asymmetries according to the direction, for example, due to a clearance error of the drive system in a given direction.

In particular, in the case of a system provided with three translation axes and having a behavior asymmetry along each of the axes, six displacements are performed with respect to a central position according to the instructions of the stepper motors, for example:
- a first displacement to coordinates $(0, 0, -30)_s$;
- a second displacement to coordinates $(+15, 0, -30)_s$;
- a third displacement to coordinates $(-15, 0, -30)s$;
- a fourth displacement to coordinates $(0, +15, -30)s$;
- a fifth displacement to coordinates $(0, -15, -30)_s$; and
- a sixth displacement to coordinates $(0, 0, +30)_s$.

In the case of a system provided with three translation axes and provided with a drive system having no asymmetry, or an asymmetry considered as non-prejudicial, it is possible to more simply perform 3 displacements only, for example:
- a first displacement to coordinates $(0, 0, -30)_s$;
- a second displacement to coordinates $(+15, 0, -30)_s$; and
- a third displacement to coordinates $(0, +15, -30)_s$.

Further, another displacement may be performed to acquire a background image enabling to ascertain the quality of the images acquired for each displacement, even in complex cases where many dust particles and debris mask the particles of interest. In particular, a displacement to coordinates $(0, 0, 300)_s$ may be performed to acquire a background image. As a variation, the background image is acquired only once if the system is deemed clean or not varying over time.

In the following, reference is made to the more complex case for a system with 3 translation axes with an asymmetrical behavior to illustrate the use of the images thus obtained, that is, six displacements.

Figure 4:
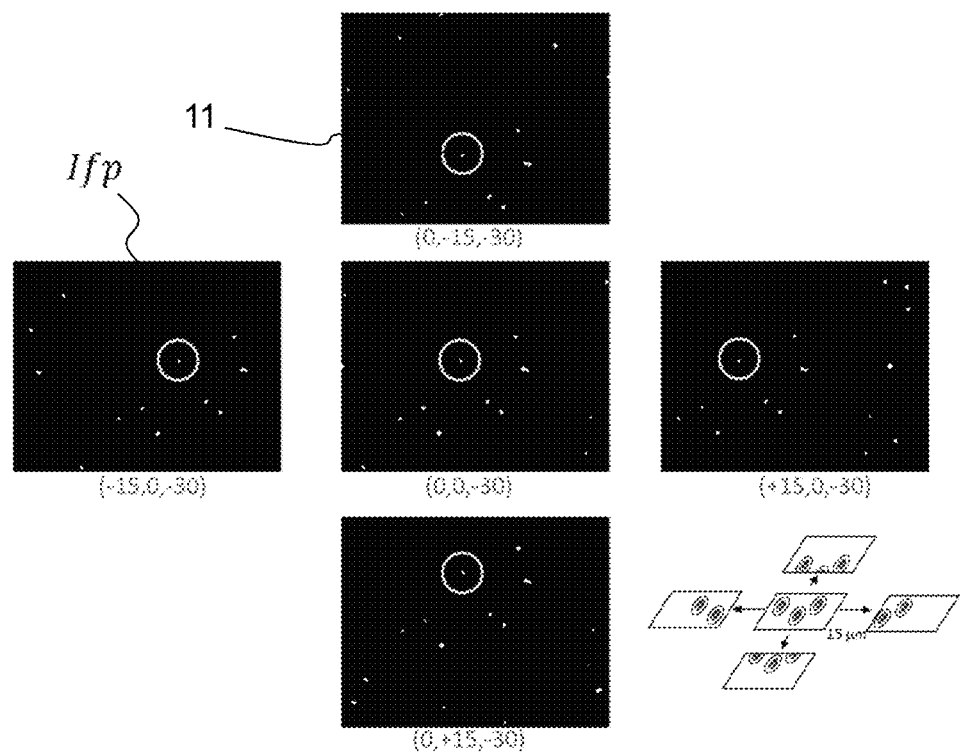

FIG. 4 illustrates five images Ifp obtained for the first five displacements. The central image Ifp illustrates the particles 11 obtained after the first displacement. The circle particle 11 is selected and its coordinates are determined by the previously-described method. The coordinates of particle 11 are stored in memory 26 and the second displacement is performed. The right-hand image Ifp illustrates the second displacement. The 15-micrometer offset along axis X causes a displacement of particle 11 with respect to the first image Ifp obtained for the first displacement. The third displacement guides sample 12 along axis X all the way to a −15-micrometer offset with respect to the first position. Thus, between the second and the third displacement, the real distance traveled by sample 12 is 30 micrometers while the other axes are invariant.

It is thus possible to simplify the determination of the coefficients of triaxial matrix Mc according to the following equation:

$$\begin{pmatrix} xn1 \\ yn1 \\ zn1 \end{pmatrix} = \begin{pmatrix} Cxx & Cxy & Cxz \\ \ldots & \ldots & \ldots \\ \ldots & \ldots & \ldots \end{pmatrix} \times \begin{pmatrix} 30 \\ 0 \\ 0 \end{pmatrix}$$

The determination of the positions of the circled particle 11 between these two displacements thus enables to obtain coefficients Cxx, Cxy, and Cxz.

Similarly, the fourth and fifth displacements enable to obtain coefficients Cxy, Cyy, and Czy according to the following simplified relation:

$$\begin{pmatrix} xn2 \\ yn2 \\ zn2 \end{pmatrix} = \begin{pmatrix} \ldots & \ldots & \ldots \\ Cyx & Cyy & Cyz \\ \ldots & \ldots & \ldots \end{pmatrix} \times \begin{pmatrix} 0 \\ 30 \\ 0 \end{pmatrix}$$

Similarly, the first and sixth displacements enable to obtain coefficients Cxz, Cyz, and Czz according to the following simplified relation:

$$\begin{pmatrix} xn3 \\ yn3 \\ zn3 \end{pmatrix} = \begin{pmatrix} \ldots & \ldots & \ldots \\ \ldots & \ldots & \ldots \\ Czx & Czy & Czz \end{pmatrix} \times \begin{pmatrix} 0 \\ 0 \\ 60 \end{pmatrix}$$

The resolution of these equation systems thus enables to obtain the coefficients of triaxial matrix Mc. A matrix Md inverse to triaxial matrix Mc models the transformation of the pixels into displacements. Inverse matrix Md is expressed according to the following coefficients:

$$Md = \begin{pmatrix} CORRx & CORRxy & CORRxz \\ CORRyx & CORRy & CORRyz \\ CORRzx & CORRzy & CORRz \end{pmatrix}$$

Thus, triaxial matrix Mc or inverse matrix Md exhibits rotations and proportional transformations on all the possible axes. According to a non-limiting example, inverse matrix Md may integrate the following coefficients:

$$Md \cong \begin{pmatrix} 0.07220 & 0.00040 & -0.00129 \\ -0.00042 & 0.07234 & -0.00063 \\ 0.00034 & -0.00019 & 0.10953 \end{pmatrix}$$

Even if the typical values are low, such values are sufficient to significantly alter the results of a measurement by the Raman spectroscopy having a desired accuracy in the order of 0.07 micrometer along axes x and y, and 0.02 micrometer along axis z. In the above example, the coefficients are obtained by considering the displacements of a single particle 11, circled on the images Ifp of FIG. 4.

As a variation, each coefficient may be obtained by an average of the variations of the coordinates of a plurality of particles 11 present on two displacements. Further, a single displacement may be performed in each direction to obtain triaxial matrix Mc.

When triaxial matrix Mc is known, a displacement instruction may be transmitted by digital processing means 25 to displace sample 12 to focus laser 17 on a particle of interest 11 having had its position determined as described hereabove. Thus, an accurate laser shot may be performed on particle of interest 11 while spectrometer 19 captures the diffusion of the light originating from laser 17 to determine characteristics, particularly physiological, of particle of interest 11. Further, triaxial matrix Mx may be used several times to determine physiological characteristics of a plurality of particles of interest 11.

Matrix Mc, and thus matrix Md, may be regularly updated, during the introduction of a sample 12 into the analysis device (for example requiring the opening/closing of a drawer or of a door capable of inducing a displacement of the different parts of the system), or each time an analysis of a particle 11 is desired.

The determination of the base change matrix by analysis of the position of a particle 11 in images has been described. A plurality of particles 11 may be analyzed to average the result and obtain a more robust determination of matrix Mc.

Similarly, the analysis of the position of a particle, for example, a bacterium in a biological sample, has been described. Any type of landmark, for example, a defect of the medium (for example, a bubble, a crack), may be used to perform the analysis. The description also mentions a stage 20 to displace sample 12 by means of stepper motors. As a variation, other displacement means may be implemented and the displacements may be performed manually by an operator. The matching matrix then indicates to the operator the accurate displacements to be performed to target a particle 11 in sample 12.

The invention claimed is:

1. A method of calibration of a device for analyzing at least one element present in a sample, said device comprising:
- a detection assembly comprising a light source configured to illuminate said sample, an optical system configured to collect a light radiation originating from said sample, and a planar image sensor configured to acquire a holographic image formed by the interference between a reference wave originating from said light source and a wave diffracted by said radiation originating from the sample; and
- a digital processing computer system configured to detect a digital position of at least one element in said sample based on said acquired holographic image, and to calculate a real position of said element according to said digital position and to a digital position and real position matching model;

wherein the calibration method comprises implementing a plurality of predetermined displacements of said sample with respect to said optical system and, for each of said displacements, detecting a digital position of a same element to determine said digital position and real position matching model according to the predetermined displacements and to the digital positions of said element after each displacement, said detection comprising:
- acquiring an image;
- digitally constructing a series of electromagnetic matrices modeling, by digital propagation of said acquired holographic image, the electromagnetic wave in planes parallel to the plane of the image sensor and comprised in said sample for a plurality of differences with respect to said plane;
- based on the series of electromagnetic matrices, determining an average focusing matrix for said sample and determining the corresponding electromagnetic matrix;
- identifying said same element in the first corresponding electromagnetic matrix; and
- determining said digital position of said same element in said electromagnetic matrix;

said digital position and real position matching model corresponding to a triaxial matrix along three axes of a metric system, said step of determining said digital position of said same element in said electromagnetic matrix being carried out along an axis, modeling the position of said element in a depth of said sample, according to said electromagnetic matrix at the average focusing distance of said sample, wherein the predetermined displacements are performed in two opposite directions for each axis of said metric system.

2. The calibration method according to claim 1, wherein the determination of the digital position and real position matching model is performed via an average of the variations of the digital positions of a plurality of elements present in said holographic image.

3. The calibration method according to claim 1, wherein said optical system has an optical axis $A_{OPT}$ and performs the conjugation between a focusing plane and a focal plane, wherein the step of acquisition of said holographic image is carried out while said optical system is placed with respect to said sample so that said elements of said sample are not in said focusing plane.

4. The calibration method according to claim 1, wherein before the steps of acquisition of a holographic image to obtain said digital positions of said element, the method comprises a step of acquisition of a background image, the holographic images obtained during said acquisition steps being normalized by said background image.

5. The calibration method according to claim 1, wherein said element corresponds to a landmark of said sample.

6. The calibration method according to claim 1, wherein said element corresponds to a particle present in said sample.

7. The calibration method according to claim 6, wherein the step of determining said digital position of said particle in said electromagnetic matrix is performed by looking for the center of said particle.

8. The calibration method according to claim 6, wherein the matching model between digital positions and real positions is formed by considering a plurality of particles present in said sample, the digital positions of the particles between two consecutive images being determined by looking for the positions of the particles of said two images, by calculating vectors coupling the particles two by two and by determining a probable displacement vector corresponding to a most recurrent vector.

9. A device for analyzing at least one element present in sample, said device comprising:
- a detection assembly comprising a light source configured to illuminate said sample, an optical system configured to collect the light radiation originating from said sample, and a planar image sensor configured to acquire a holographic image formed by the interference between a reference wave originating from said light source and a wave diffracted by said radiation originating from the sample; and
- a digital processing computer system configured to detect a digital position of at least one element in said sample based on said acquired holographic image and to calculate a real position of said element according to said digital position and to a digital position and real position matching model;
- a stage for displacing the sample with respect to the optical system, said displacement means being driven by the digital processing computer system;

wherein the digital processing computer system is configured to control the stage to perform a plurality of predetermined displacements of said sample with respect to said optical system and, for each of said displacements, to detect a digital position of a same element to determine said digital position and real position matching model according to the predetermined displacements and to the digital positions of said element after each displacement, the detection of the digital position comprising:
- acquiring a holographic image;
- digitally constructing a series of electromagnetic matrices modeling, by digital propagation of said acquired holographic image, the electromagnetic wave in planes parallel to the plane of the image sensor and comprised in said sample for a plurality of deviations with respect to said plane;

based on the series of electromagnetic matrices, determining an average focusing matrix for said sample and determining the corresponding electromagnetic matrix;

identifying said same element in the first corresponding electromagnetic matrix; and determining said digital position of said same element in said electromagnetic matrix, said digital position and real position matching model corresponding to a triaxial matrix along three axes of a metric system, said step of determining said digital position of said same element in said electromagnetic matrix being carried out along an axis, modeling the position of said element in the depth of said sample, according to said electromagnetic matrix at the average focusing distance of said sample, wherein the predetermined displacements are performed in two opposite directions for each axis of said metric system.

\* \* \* \* \*